United States Patent [19]

Hammer et al.

[11] Patent Number: 4,872,204
[45] Date of Patent: Oct. 3, 1989

[54] METHOD OF OPERATING A RADIO TRANSMISSION OR COMMUNICATION SYSTEM INCLUDING A CENTRAL STATION AND A PLURALITY OF INDIVIDUAL REMOTE STATIONS, A RADIO TRANSMISSION OR COMMUNICATION SYSTEM, AND A REMOTE STATION

[75] Inventors: Ole Hammer, Solrod Strand, Denmark; Jean-Jacques Gras, Neuilly-sur-Marne, France

[73] Assignee: Motorola, Inc., Schaumburg, Ill.

[21] Appl. No.: 124,210

[22] PCT Filed: Mar. 3, 1987

[86] PCT No.: PCT/DK87/00024

§ 371 Date: Nov. 24, 1987

§ 102(e) Date: Nov. 24, 1987

[87] PCT Pub. No.: WO87/05458

PCT Pub. Date: Sep. 11, 1987

[30] Foreign Application Priority Data

Mar. 3, 1986 [DK] Denmark ................................ 966/86

[51] Int. Cl.⁴ .......................... H04B 1/00; H04B 7/00
[52] U.S. Cl. ........................................ 455/54; 455/56; 455/32; 379/59; 340/825.52
[58] Field of Search ....................... 455/33, 35, 32, 53, 455/54, 56, 34; 379/59, 60, 63; 340/825.44, 825.47, 825.48, 825.52

[56] References Cited

U.S. PATENT DOCUMENTS

| | | | |
|---|---|---|---|
| 4,597,105 | 6/1986 | Freeburg | 455/33 |
| 4,633,463 | 12/1986 | Mack | 455/56 X |
| 4,644,347 | 2/1987 | Lucas et al. | 340/825.44 X |
| 4,669,107 | 5/1987 | Eriksson-Lennartsson | 455/56 X |

Primary Examiner—Robert L. Griffin
Assistant Examiner—Ralph Smith
Attorney, Agent, or Firm—Steven G. Parmelee

[57] ABSTRACT

A plurality of central stations generate and transmit control signals that are received by individual remote stations. Ordinarily, each remote station is assigned to a specific central station. The control signals include a first part that includes identifying information for one or more intended receiving stations, and a second part that includes control signals for the intended receiving station or stations. The remote stations shift operation between a first and second operating mode. In the first mode, they receive the control signals from the central station to which they are assigned, and in the second mode, they do not. For a period of time that is substantially coincident with the first part of the control signals, the remote stations operate in the first operating mode to determine whether the subsequent messages are intended for them. If they are, the remote stations continue to operate in this mode. Otherwise, the remote stations begin operating in the second mode for the duration of the control signal transmission.

6 Claims, 2 Drawing Sheets

METHOD OF OPERATING A RADIO TRANSMISSION OR COMMUNICATION SYSTEM INCLUDING A CENTRAL STATION AND A PLURALITY OF INDIVIDUAL REMOTE STATIONS, A RADIO TRANSMISSION OR COMMUNICATION SYSTEM, AND A REMOTE STATION

BACKGROUND OF THE INVENTION

The present invention relates to the transmission or communication field.

In many different applications, e.g. within the the wireless or radio transmission or communication field, a system is provided including a number of central stations and a plurality of individual remote stations each communicating with a central station to which the individual remote station in question is assigned and from which it receives a control signal. In the system, particularly in systems including a large number of individual remote stations, the control signal generated by and transmitted from the central station to which the remote station in question is assigned together with other remote stations are transmitted to all these remote stations simultaneously. The individual remote station is consequently to determine whether the control signal is intended for the remote station itself or not, i.e. intended for one or more remote stations different from the remote station itself, and for this purpose the control signal is composed of two parts which constitute respective periods of time of the control signal and which include information regarding the intended receiving station or the intended receiving stations and the control information itself, respectively.

In conventional systems of the above type, the individual remote station permanently supervises and/or decodes the control signal in order to detect whether the information transmitted from the central station is intended for the remote station itself. Most of the time, the individual remote station only has to determine whether the first part of the signal includes information regarding the receiving station itself, i.e. including an address corresponding to the address of the remote station itself, or, alternatively, a so-called telegram information relevant for the remote station itself or relevant for its operation. While the second part of the control signal intended for one or more remote stations different from the remote station in question is transmitted to the remote stations, the remote station in question receives, but does not act upon information transmitted from the central station, as the information is not relevant for the remote station, and for a period of time corresponding to the second part of the control signal the remote station or at least its receiver section is inactive.

SUMMARY OF THE INVENTION

As will be understood, the operation of the system described above in which the control signals are transmitted to the individual remote stations simultaneously, the capacity of the individual remote stations is not fully utilized as the control signal transmitted from the central station to which the remote station in question is assigned is most of the time not relevant for the remote station in question, which is determined by the individual remote station by its evaluation of the first part of the control signal.

It is therefore an object of the present invention to provide a method of operating a radio transmission or communication system of the above type, i.e. a radio transmission or communication system including a number of central stations and a plurality of individual remote stations, in accordance with which method the capacity of the individual remote stations is more fully utilized for improving the operation of the system and more specifically for improving the quality of transmission and reception of the individual remote station.

This object is obtained by a method of the present invention and of operating a radio transmission or communication system including a number of central stations, and a plurality of individual remote stations said central stations generating and transmitting control signals in respective transmission channels, each remote station being assigned a specific central station of said number of individual central stations, each of said control stations comprising a first part constituting a first period of time of the control signal and including information identifying one or more intended receiving stations of said plurality of individual remote stations, and a second part constituting a second period of time of the control signal and including control information for said one or more intended receiving stations, each individual remote station being shiftable between a first operational mode in which it is receiving the control signal from the central station to which it is assigned, and an alternative, second operational mode in which it is not receiving the control signal from the central station to which it is assigned, the method comprising:

operating each remote station in said first operational mode for a period of time substantially corresponding to said first period of time in order to have it evaluate whether it is identical to one of said one or more intended receiving stations, and operating each remote station which is not identical to one of said one or more intended receiving stations in said second operational mode for a period of time substantially corresponding to said second period of time for receiving a control signal from an alternative central station different from the central station to which it is assigned, or, alternatively, operating each remote station which is identical to one of said one or more intended receiving stations in said first operational mode for a period of time substantially corresponding to said second period of time.

In its alternative or second operational mode the individual remote station may perform different, alternative operations, such as search for control signals transmitted from other remote stations, transmit information to the central station to which it is assigned or to other remote stations, or, as will be described in greater detail below, receive a control signal or control signals from a central station or central stations different from the central station to which it is assigned.

In accordance with the method of the present invention, the control signal may be repeatedly transmitted from the central station. The repetition of the transmission of the control signal from the central station reduces the risk that the individual remote station misevaluates whether it is identical to the one or more intended receiving stations.

As mentioned above, in its alternative, second operational mode as described above, the individual remote station may detect if the alternative individual central station transmits information intended for the remote station, or, alternatively, in accordance with the teaching of the present invention search for a central station transmitting with a better signal quality as expressed in the signal-to-noise-ration or signal strength.

In accordance with this aspect of the present invention, i.e. the search of the individual remote station for a central station of a higher transmission quality, each individual remote station in said first operational mode is preferably operated to detect and determine the quality of the transmission channel of the central station to which it is assigned, and in said alternative, second operational mode each individual remote station is operated to detect and determine the quality of the transmission channel of said alternative central station and to compare said qualities in order to determine whether the alternative central station is being received at a higher transmission quality than the central station to which the remote station is assigned.

Provided the transmission channel of the alternative central station is of a higher quality than the transmission channel of said specific central station to which the remote station is assigned, the individual remote station may, as is well known in the art, be assigned the alternative central station.

In case the specific central station to which the remote station is assigned is received at a high quality or level, or preferably at a predetermined quality level as expressed in terms of signal-to-noise-ratio or in terms of signal strength, the system may be operated in such a manner that the individual remote station in its alternative, second operational mode does not compare said qualities, i.e. does not search for a possible alternative central station different from the central station to which the remote station is assigned, as it is assumed that no alternative central station will be received at a higher quality level. In accordance with this aspect of the present invention, each individual remote station is consequently operated only to carry out the comparison of said qualities provided the quality of the transmission channel of the central station to which the remote station is assigned is below a predetermined level of quality.

In order to have the individual remote station determine whichever central station is transmitting at the best transmission quality, in accordance with a further embodiment of the method of the present invention each individual remote station in said alternative, second operational mode may be operated to scan the transmission channels of all central stations of said number of individual central stations different from the central station to which the individual remote station is assigned for detecting and determining the qualities of said transmission channels.

Provided the second part of the control signal is of a large duration, each individual remote station may in accordance with the present invention be operated to carry out the above scanning and transmission channel quality detection and determination within a single period of time corresponding to the second part of the control signal. In the presently preferred application of the method of the present invention in the RADIO-COM 2000 system developed by PTT, Postes, Télégraphes et Téléphones of France (the French public communications organisation), the second part of the control signal is not of a duration which allows for a scanning of the transmission channels of all central stations different from the central station to which the remote station is assigned. In accordance with a further embodiment of the method of the present invention, the scanning of the transmission channels is performed stepwise during the repetition of the transmission of the control signal from the central station to which the remote station is assigned. In accordance with this embodiment of the invention, a single transmission channel different from the transmission channel of the central station to which the remote station is assigned has its transmission quality detected and determined and further compared to the transmission quality of the channel of the central station to which the remote station is assigned within said second period of time of the control signal.

The present invention also relates to a radio transmission or communication system of the above type, i.e. a radio transmission or communication system including a number of central stations and a plurality of individual remote stations and further fulfilling any of the above operational requirements. In the presently preferred embodiment of the system according to the present invention, the central stations are stationary radio transmitters, and the remote stations are mobile radio transmitters. Furthermore, in accordance with the above presently preferred embodiment of the invention the system conforms to the RADIOCOM 2000 system of PTT (Postes, Télégraphes et Téléphones, the French public communications organisation).

BRIEF DESCRIPTION OF THE DRAWINGS

The present invention also relates to a mobile station fulfilling any of the above operational requirements of the method of the present invention and further any of the operational requirements of the system of the present invention.

The invention will now be further described with reference to the drawings, wherein.

DESCRIPTION OF THE PREFERRED EMBODIMENT

Figure 1:
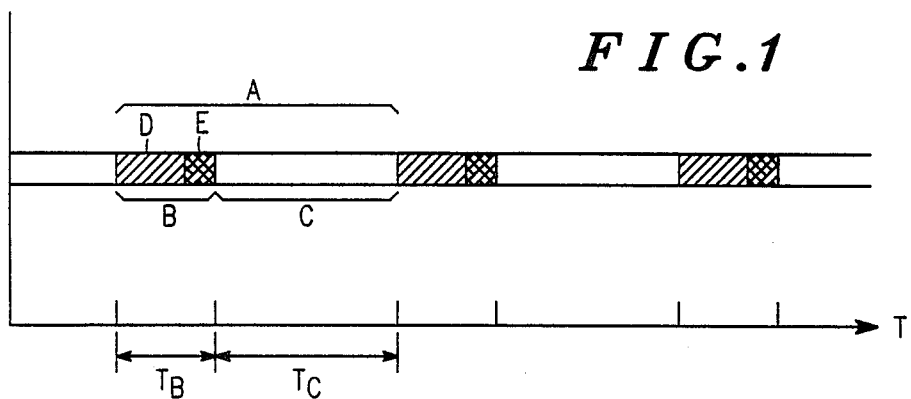
FIG. 1 is a diagrammatical view of a control signal or a telegram transmitted from a base station constituting a central station of a system of the present invention in a mobile radio communication system.

In FIG. 1, a diagram is shown illustrating a telegram or a control signal which is generated by and transmitted from a central station in a transmission or communication channel, such as at a specific radio frequency. Apart from the central station or base station generating and transmitting the telgram shown in FIG. 1, the system includes a plurality of remote stations or mobile stations and further central stations or base stations which provide a total coverage of a geographic area, such as a country, e.g. the RADIOCOM 2000 system of PTT, the specifications of which radio system are referred to. The telegram is composed of segments, one of which is designated A and which are repeated as the time T lapses. The telegram may include analog or digital information. In the above-mentioned RADIO-COM 2000 system, the telegram includes binarily coded information, i.e. digital information which is decoded by the receiving remote station or mobile station. The telegram segment A is composed of a first part B and a second part C. The first and second parts, B and C, of the telegram are of the duration $T_b$ and $T_c$, respectively. The first part B is further divided into two subparts designated D and E. The first part B of the telegram A basically includes the information regarding the remote or base station or base stations which is or are intended to receive the telegram A transmitted from the base station. It should be mentioned that in the RADIO-COM 2000 system, each individual mobile station is assigned a specific base station with which the mobile station communicates and in which the tarif calculation and debiting is carried out as explained in the RADIO-COM 2000 system specifications published by the PTT. The second part C of the telegram A includes the control information for the intended receiving mobile station or the intended receiving mobile stations.

The first part B of the telegram A including information regarding the intended receiving mobile station or the intended receiving mobile stations may include a specific addressing information and further a message type specification in the subparts D and E, respectively.

In the mobile radio communication system, e.g. the above RADIOCOM 2000 system, the mobile stations assigned the base station generating and transmitting the telegram A shown in FIG. 1 each receive the telegram A. Apart from the control information channel in which the telegram A shown in FIG. 1 is transmitted from the base station to the individual mobile stations assigned the base station, the base station and the individual mobile stations communicate in telephone communication through radio channels of radio frequencies different from the radio frequency of the control information transmission or telegram transmission channel shown in FIG. 1. Although in accordance with the RADIOCOM 2000 system specifications the telegram A shown in FIG. 1 is a control telegram exclusively, the teaching of the present invention may alternatively be employed in applications in which the second part C of the telegram A includes information different from contol information, such as speech, which may e.g. be speech which is time compressed and which is to be time expanded in the intended receiving mobile station.

In accordance with the RADIOCOM 2000 system specifications, the mobile station is tuned to the radio frequency of the control information transmission channel of the base station to which the mobile station is assigned, provided the mobile station is not performing a radio communication with the base station at a radio frequency which is different from the radio frequency of the control information transmission channel. In accordance with the present invention it has been realized that while listening to the control information transmission channel and mobile station does not fully utilize its capacity, as most of the telegrams such as the telegram A shown in FIG. 1 transmitted from the base station do not include information intended for the mobile station in question. In accordance with the teaching of the present invention it is therefore possible to utilize the capacity of the mobile station for purposes different from the mere reception of the control information transmission channel, as the information included in part C of the telegram A is not acted upon by the mobile station provided the part B of the telegram A has not informed the mobile station that the information to follow in the telegram part C is intended for the mobile station. In the time period $T_c$ corresponding to the duration of reception of the telegram part C, the mobile station may be employed for an alternative purpose, and in accordance with the presently preferred embodiment of the invention be employed for search for an alternative base station, the control information transmission of which is received at a higher signal strength than the signal strength of reception of control information transmission from the base station to which the mobile station is assigned, provided that the signal strength of the control information from the base station to which the mobile station is assigned is below a predetermined signal level which allows for the search for alternative base stations as will be described below with reference to FIG. 2.

Figure 2:
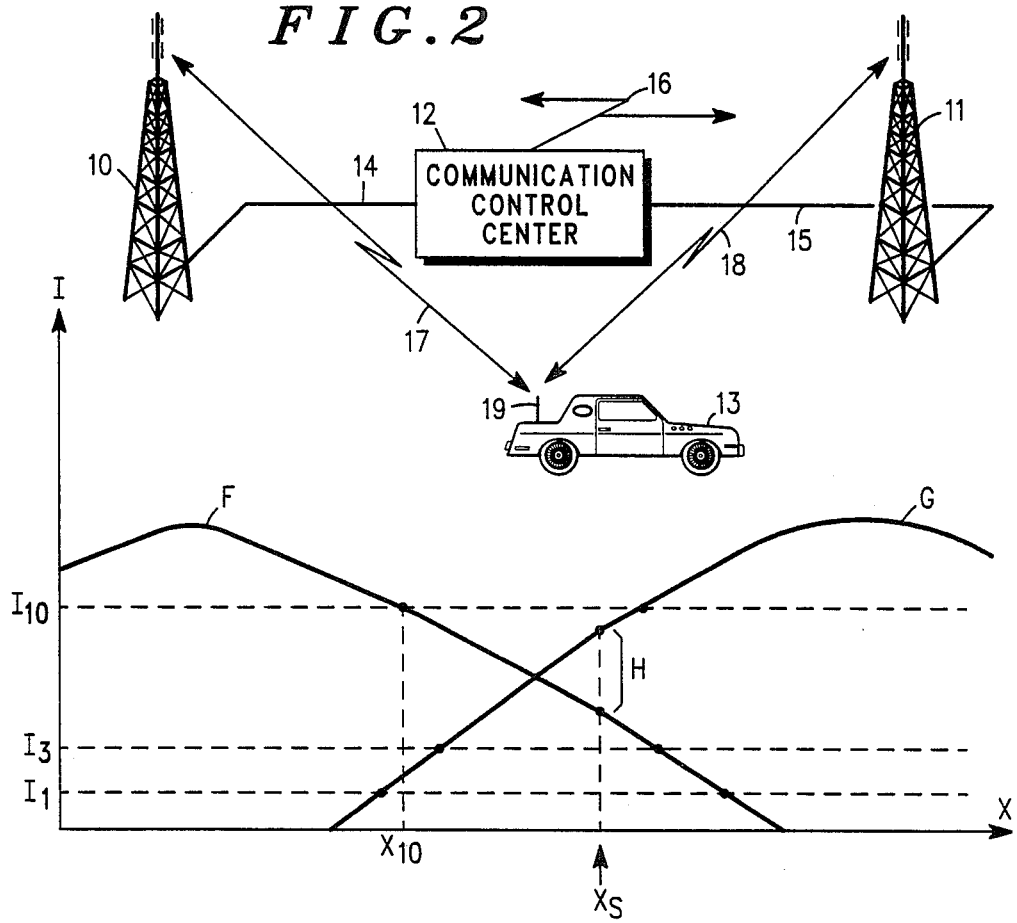
FIG. 2 is a schematical and diagrammatical view of a mobile radio communication system including two base stations and a single mobile station and further of a graph illustrating the shifting from a base station to which the mobile is assigned to an alternative base station.

In the upper part of FIG. 2, a schematical view of a radio communication system is shown, including a first base station 10 and a second base station 11 communicating with a mobile station 13 having an aerial 19 and further communicating with each other through connections 14 and 15 and further through a communication control center designated the reference numeral 12 which further communicates with alternative base stations corresponding to the base stations 10 and 11 and communication centers corresponding to the center 12 through hard wire connections or wireless communication channels as is indicated by the reference numeral 16. The mobile station 13 communicates with the base stations 10 and 11 in a duplex communication as is indicated by the double arrow symbols designated the reference numerals 17 and 18, respectively.

In the lower part of FIG. 2, a diagram is shown illustrating the signal strength versus the distance X from the base station 10 to the base station 11. In this diagram two curves designated F and G are shown illustrating the signal strength of reception at the mobile station 13 from the base station 10 and from the base station 11, respectively, as a function of the distance X from the base station 10 in the direction towards the base station 11. It is assumed that the mobile station 13 is initially assigned the base station 10 and travels in a direction of movement from the base station 10 towards the base station 11, i.e. from the left to the right in FIG. 2. It is further assumed that the mobile station 13 is not involved in radio communication with the base station 10 and consequently receives or monitors the control information transmission channel of the base station 10, i.e. receives the telegrams of the information channel from the base station 10, such as telegrams of the type shown in FIG. 1. In accordance with the teaching of the present invention, the mobile station 13 starts searching for an alternative base station to be assigned as the signal strength I of reception of the control information transmission channel received from the base station 10 decreases below a predetermined level which is designated $I_{10}$ in the diagram in the lower part of FIG. 2. In an implementation of the mobile station for application in the RADIOCOM 2000 system the above predetermined threshold intensity $I_{10}$ is 10 $\mu V$. As the mobile station 13 travels beyond the distance designated $X_{10}$ from the base station 10 at which the intensity of reception of the control information transmission channel from the base station 10 decreases below the predetermined level $I_{10}$, the mobile station starts searching for an alternative base station to be assigned.

In accordance with the teaching of the present invention, the search for an alternative base station to be assigned is performed during the time period $T_c$ in which the mobile station is presented to the control information part C of the telegram A. Provided that the mobile station has determined from the information included in the first part B of the telegram A and by decoding the information that the information of the second part C of the telegram A is not intended for the mobile station 13, the mobile station 13 shifts after the conclusion of the reception of the first part B from its operational mode of receiving an information transmission channel of the base station 10 to an operational mode of detecting and determining the signal strength of an alternative control information transmission channel of an alternative base station. The mobile station is consequently tuned to a reception of an alternative radio frequency of an alternative control information transmission channel of the alternative base station. In the RADIOCOM 2000 system, a total of 32 control information transmission channels are included. Consequently, in accordance with the RADIOCOM 2000 system implementation the mobile station 13 is adapted to scan 31 alternative control information transmission channels of the alternative base stations.

In the RADIOCOM 2000 system, the total duration $T_b + T_c$ of the telegram A is approximately 150 ms depending on the actual frequency of the control information transmission channel, and the time periods $T_b$ and $T_c$ are approximately 50 ms and 100 ms, respectively.

As the mobile station 13 moves beyond the distance $X_{10}$ from the base station 10, the signal strength of reception of the control information transmission channel of the base station 10 decreases as indicated by the curve F, whereas the signal strength of reception of the control information transmission channel of the base station 11 increases as indicated by the curve G. In a point corresponding to the distance $X_s$ from the base station 10, the mobile station 13 receives control information from the base station 11 at a signal strength H in excess of the signal strength of reception of the control information from the base station 10 as indicated by the vertical difference between the curves F and G. Assuming that after three scannings of all control information transmission channels of the system, i.e. after 93 scanning and signal strength comparison routines the mobile station has determined that the signal strength of reception from the base station 11 exceeds the signal strength of reception from the base station 10, the mobile 13 addresses the base station 11 and asks for assignment thereto.

In FIG. 2 two further intensities designated $I_3$ and $I_1$ are shown illustrating the threshold according to the RADIOCOM 2000 system specifications for search for an alternative base station and the signal strength corresponding to the telegram bit-error threshold according to the RADIOCOM 2000 system specification, respectively. The intensity $I_3$ is 3 $\mu V$ and the intensity $I_1$ is approximately 1 $\mu V$.

Figure 3:
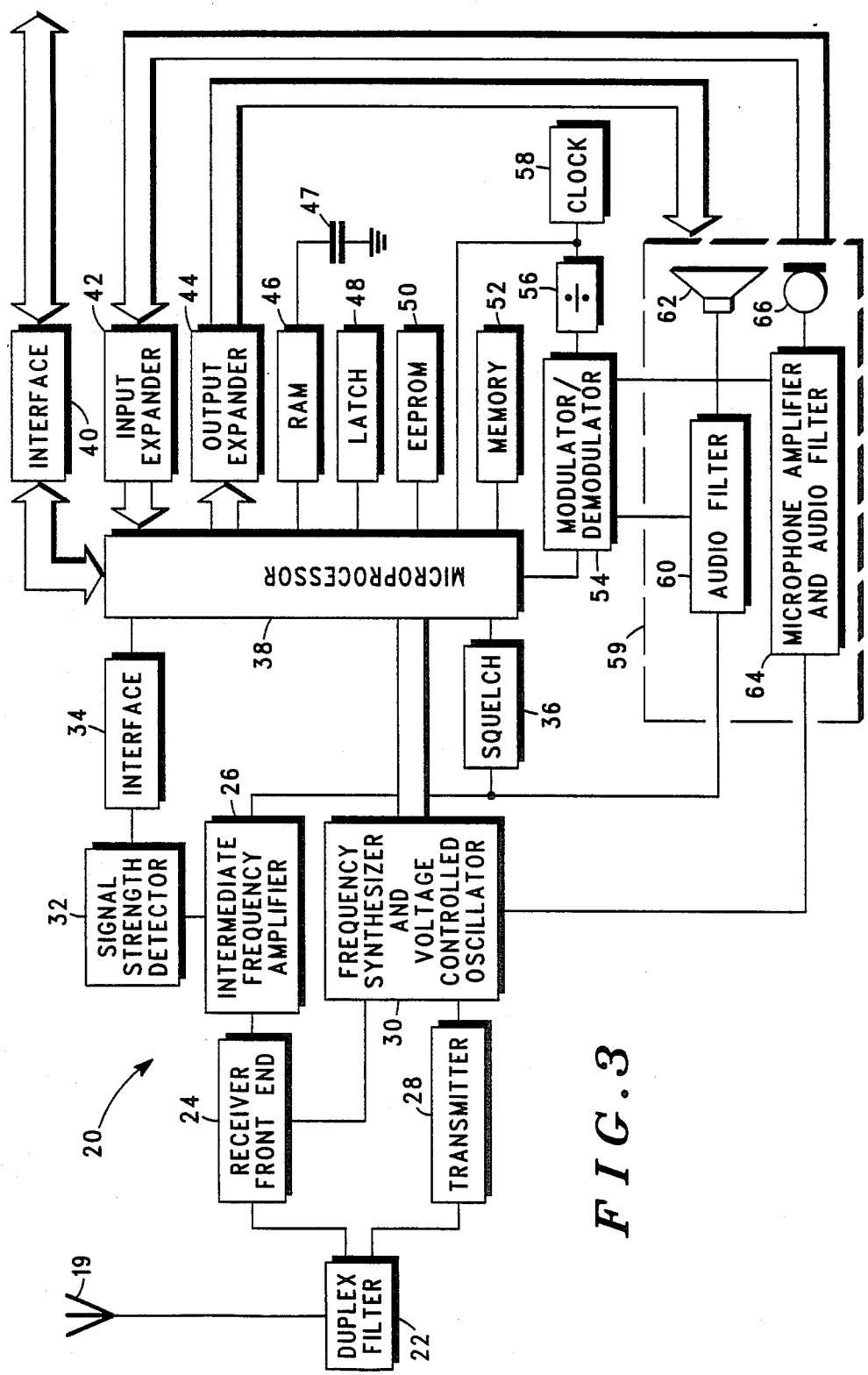
FIG. 3 is a diagrammatical view of the presently preferred implementation of a mobile radio transmitter according to the invention.

As mentioned above, a remote station or a mobile station has been implemented in accordance with the specifications or requirements of the RADIOCOM 2000 system of PTT. In FIG. 3, a block diagram of this implementation is shown. The mobile station is designated the reference numeral 20 in its entirety and comprises an aerial 19 which is connected to a duplex filter block 22 which defines two parts of the mobile station, viz. a receiver part and a transmitter part. The receiver part comprises a receiver front end block 24 and an intermediate-frequency amplifier block 26. The transmitter part of the mobile station 20 comprises a transmitter block 28 and a frequency synthesizer and voltage controlled oscillator block 30 which further communicates with the receiver front end block 24 and controls the tuning thereof. The mobile station 20 further comprises a control part to be described below and a audio frequency part which is shown in the lower part of FIG. 3 and included in a dotted line block 59 and comprises an audio filter and loudspeaker amplifier block 60 which is connected to an output of the intermediate-frequency amplifier block 26 and has its output connected to a loudspeaker unit 62, and further a microphone amplifier and audio filter block 64 which has its input connected to a microphone unit 66 and its output connected to the frequency synthesizer and voltage controlled oscillator block 30.

The control part of the mobile station 20 comprises a microprocessor block 38 which communicates with the frequency synthesizer and voltage controlled oscillator block 30, a first interface block 40 for interfacing an external control means such as a switch board, not shown in FIG. 3, an input expander block 42 for interfacing the microprocessor block 38 and the microphone amplifier and audio filter block 64 and further an output expander block 44 for interfacing the microprocessor block 38 and the audio filter and loudspeaker amplifier block 60.

The microprocessor block 38 is also connected to the connection from the output of the intermediate-frequency amplifier block 26 and the input of the audio filter and loudspeaker amplifier block 60 through a squelch circuit block 36, and receives information from the intermediate-frequency amplifier block 26 regarding the quality of reception through a radio signal strength intensity detector block 32 and a radio signal strength intensity interface block 34. The microprocessor block 38 further communicates with a random access memory (RAM) block 46 which is connected to a back-up power supply battery 47, a latch block 48, an electrically erasable programmable read only memory ($E^2PROM$) block 50 and further a program memory block 52 in which the control programs of the microprocessor are stored. The microprocessor block 38 further receives clock pulses from an X-tal clock 58 which supplies its clock pulses to a clock frequency divider block 56 which is further connected to a modulation and demodulation (modem) block 54. The modem block 54 further communicates with the microprocessor block 38 and the blocks 60 and 64 of the audio frequency part of the mobile station 20.

In accordance with the teaching of the present invention the mobile station 20 is operated in the following manner:

Provided that the mobile station 20 is assigned a base station, e.g. the base station 10 shown in FIG. 2, and further provided that the mobile station 20 is not involved in radio communication with the base station to which it is assigned, e.g. the base station 10 shown in FIG. 2, the mobile station 20 receives the control information transmission channel of the base station to which it is assigned. The control information is received at the aerial 19 and through the duplex filter block 22 guided to the receiver front end block 24 and further to the intermediate-frequency amplifier block 26. From the intermediate-frequency amplifier block 26 and through the radio signal strength indicator block 32 and the interface block 34 the microprocessor block 38 is informed about the signal strength of reception. The coded information of part B of the telegram A is supplied to the microprocessor 38 for decoding therein from the output of the intermediate-frequency amplifier block 26 through the audio filter and loudspeaker amplifier block 60 and further through the modem block 54. As the mobile station 20 receives the first part B of the telegram A, the receiver front end block 24 is tuned to the radio frequency channel of the control information transmission channel of the base station to which the mobile station is assigned. By means of the radio signal strength indicator detector block 32, the microprocessor is informed about the signal level of reception of the control information transmission channel and determines whether the signal level of reception is above or below the above-mentioned threshold or level $I_{10}$ indicated in the lower part of FIG. 2.

Provided that the signal level of reception is below the $I_{10}$ level, the microprocessor 38 controls the frequency synthesizer and voltage controlled oscillator block 30 to tune the receiver front end to an alternative base station after reception of the first part B of the telegram and after the microprocessor 38 has determined that the D and E subparts of the first part B of the telegram A do not indicate to the mobile station that the second part C of the telegram A includes information which is relevant or intended for the mobile station. The receiver front end 20 is tuned to an alternative base station and the signal strength of reception thereof is determined by means of the radio signal strength indicator detector block 32. Controlled by its program memory block 52, the microprocessor block 38 continues to search for a base station which is received at a signal level of reception which is higher than the signal level of reception of the base station to which the mobile station is assigned.

In the presently preferred embodiment of the invention, a higher signal strength level of reception is to be determined three times for an alternative base station before the mobile station contacts the alternative base station and asks for assignment thereto. In the presently preferred embodiment of the invention, the time constant of stabilization of the radio signal strength indicator detector 32 is approximately 10 ms, and the time constant of stabilization of frequency stabilizer and voltage controlled oscillator block 30, and further the receiver front end block 24 are also approximately 10 ms.

When the microprocessor block 38 has informed the frequency synthesizer and voltage controlled oscillator block 30 to tune the receiver front end block 24 to an alternative base station, a total time period of 20 ms lapses before the microprocessor block 38 receives a stable signal strength indication from the output of the interface block 34 regarding the signal strength reception. In the RADIOCOM 2000 system, the time period $T_c$, the duration of reception of the second part C of the telegram A, as mentioned above is approximately 100 ms. Within this 100 ms time period, the mobile station 20 is to be tuned twice, provided that it searches for an alternative base station, viz. to be tuned for the alternative base station and to be returned for the base station to which the mobile station is assigned. The total time required for the tuning and retuning of the mobile station including the time periods for obtaining stable radio strength signal indications is approximately 40 ms. As will be understood, the high speed tuning/returning and further the highly responsive radio signal strength indications are of the utmost importance for carrying out the teaching of the present invention.

EXAMPLE

In an implementation of the above described presently preferred embodiment of the mobile station according to the invention, the duplex filter block 22 was implemented by means of a custom made diplexer manufactured by the company Kokunen, the receiver front end block 24 was constituted by a discrete component implementation of conventional configuration, the intermediate-frequency amplifier block 26 was implemented by means of an intermediate-frequency integrated circuit of the type TBB 2469 from Siemens, the transmitter block 28 was implemented by means of a three stage transmitter circuit with power regulation using discrete components, the frequency synthesizer and voltage controlled oscillator block 30 was implemented by means of a synthesizer integrated circuit of the type MC 145159 from Motorola and by means of a voltage controlled oscillator integrated circuit of the type OM 806 from Valco, the radio signal strength indicator detector 32 was implemented by means of a three stage transistor amplifier, a diode rectifier and an operational amplifier of the type LM 224 constituting an output buffer stage, the radio signal strength indicator interface block 34 was constituted by an analog/digital converter of the type ADC 0804 from National Semiconductors, the squelch block 36 was implemented by means of hybrid thick film circuit including discrete components of Storno type, the microprocessor block 38 was implemented by means of a microprocessor of the type 8031 from Intel, the interface block 40, input expander block 42 and the output expander block 44 were implemented with standard CMOS integrated circuits and further including discrete components, the random access memory block 46 was of the type DS 1220 from Dallas Semiconductor, the back-up power supply battery 47 was constituted by a lithium battery integrated in the random access memory block 46, the latch block 48 was constituted by a conventional CMOS latch, the electrically erasable programmable read only memory block 50 was implemented by means of a circuit of the type X2816 from Xicor, the modem block 54 was constituted by a 1200 baud modem implemented by means of an integrated circuit of the type FX 409 (CML) and a 50 baud modem implemented by means of circuits of the type XR 2211 and XR 2207 (EXAR), the audio filter and loudspeaker amplifier block 60 was implemented by means of audio filters including operational amplifiers of the type LM 224 and further discrete components, by a mute and volume control implemented by means of analog switches of the type HEF 4052 (Motorola) and by an integrated audio amplifier circuit of the type TDA 1515 Philips, and the microphone amplifier and audio filter block 64 was implemented by means of operational amplifier circuits including LM 224 operational amplifiers and further discrete components.

It should be understood that although the present invention has been described with reference to an implementation of a mobile station including a micro processor and in which the shifting between the first and the second operational mode of the apparatus is carried out controlled by the soft ware of the microprocessor, a so-called hard ware implementation—in which the shifting of the mobile station between its first and second operational mode is carried out by means of switches such as transistor switches or CMOS switches—is also to be considered part of the present invention.

The invention has been described above with reference to a particular application and further with reference to the specific RADIOCOM 2000 system application. However, it should be understood that the teaching of the present invention may be implemented in numerous ways and that these implementations should be considered part of the present invention as defined in the appending claims.

We claim:

1. A method of operating a radio transmission or communication system including a number of central stations, and a plurality of individual remote stations said central stations generating and transmitting control signals in respective transmission channels, each remote station being assigned a specific central station of said number of individual central stations, each of said control signals comprising a first part constituting a first period of time of the control signal and including information identifying one or more intended receiving stations of said plurality of individual remote stations, and a second part constituting a second period of time of the control signal and including control information for said one or more intended receiving stations, each individual remote station being shiftable between a first operational mode in which it is receiving the control signal from the central station to which it is assigned, and a second operational mode in which it is not receiving the control signal from the central station to which it is assigned, the method comprising:

operating each remote station in said first operational mode for a period of time substantially corresponding to said first period of time in order to have it evaluate whether it is identical to one of said one or more intended receiving stations;

operating each remote station which is not identical to one of said one or more intended receiving stations in said second operational mode for a period of time substantially corresponding to said second period of time for receiving a control signal from an alternative central station different from the central station to which it is assigned; and operating each remote station which is identical to one of said one or more intended receiving stations in said first operational mode for a period of time substantially corresponding to said second period of time.

2. A method according to claim 1, wherein the control signal is repeatedly transmitted from the central station.

3. A method according to claim 1 or 2, wherein in said first operational mode at least some of the individual remote stations are further operated to detect and determine signal quality of the transmission channel of the central station to which it is assigned, and wherein in said second operational ode at least some of the individual remote stations are operated to detect and determine signal quality of the transmission channel of said alternative central station and to compare said qualities.

4. A method according to claim 3, wherein at least some of the individual remote stations are operated only to carry out the comparison of said qualities, provided the signal quality of the transmission channel of the central station to which it is assigned is below a predetermined level of quality.

5. A method according to claim 3, wherein in said second operational mode at least some of the individual remote stations are operated to scan the transmission channels of all central stations of said number of individual central stations different from the central station to which it is assigned, for detecting and determining the signal qualities of at least some of said transmission channels.

6. A method according to claim 5, wherein the scanning of said transmission channels is performed stepwise during a repetition of the transmission of the control signal from the central station to which the remote station is assigned.

* * * * *

UNITED STATES PATENT AND TRADEMARK OFFICE
CERTIFICATE OF CORRECTION

PATENT NO. : 4,872,204
DATED : October 3, 1989
INVENTOR(S) : Hammer et al.

It is certified that error appears in the above-identified patent and that said Letters Patent is hereby corrected as shown below:

On the title page, item [54] and in column 1, lines 2-8:
The title should be --Dual Mode Radio Receiver With Scanning Capability--.

Signed and Sealed this

Twenty-second Day of January, 1991

Attest:

HARRY F. MANBECK, JR.

*Attesting Officer*  *Commissioner of Patents and Trademarks*